United States Patent [19]

Terasima et al.

[11] Patent Number: 5,437,464
[45] Date of Patent: Aug. 1, 1995

[54] DATA READING AND IMAGE PROCESSING SYSTEM FOR CD-ROM

[75] Inventors: Junichi Terasima; Toshinori Asai, both of Tokyo; Masaki Kawahori, Chiba, all of Japan

[73] Assignee: Kabushiki Kaisha Sega Enterprises, Tokyo, Japan

[21] Appl. No.: 931,715

[22] Filed: Aug. 18, 1992

[30] Foreign Application Priority Data

Aug. 30, 1991 [JP] Japan .................................. 3-219677
Dec. 12, 1991 [JP] Japan .................................. 3-351393

[51] Int. Cl.⁶ .............................................. G06F 3/14
[52] U.S. Cl. .................................. 273/434; 273/433; 273/436; 273/437; 364/410; 395/163; 395/164; 395/494; 395/481
[58] Field of Search .............................. 273/433–438; 345/213, 199; 395/200; 360/32, 48; 364/410, 131, 133, 134; 434/308, 309, 318, 323, 335

[56] References Cited

U.S. PATENT DOCUMENTS

| | | | |
|---|---|---|---|
| 4,519,656 | 5/1985 | Solimeno et al. | 364/410 |
| 4,787,040 | 11/1988 | Ames et al. | 364/132 |
| 4,853,876 | 8/1989 | Hibino et al. | 345/199 |
| 4,866,515 | 9/1989 | Tagawa et al. | 358/86 |
| 5,006,936 | 4/1991 | Hooks, Jr. | |
| 5,046,004 | 9/1991 | Tsumara et al. | 360/32 X |
| 5,065,345 | 11/1991 | Knowles et al. | 395/154 |
| 5,208,745 | 5/1993 | Quentin et al. | 364/188 |
| 5,267,865 | 12/1993 | Lee et al. | 434/350 |

FOREIGN PATENT DOCUMENTS

| | | |
|---|---|---|
| 0099189 | 6/1983 | European Pat. Off. . |
| 0109189 | 10/1983 | European Pat. Off. . |
| 2104760 | 8/1982 | United Kingdom . |

*Primary Examiner*—Vincent Millin
*Assistant Examiner*—Kerry Owens
*Attorney, Agent, or Firm*—Price, Gess & Ubell

[57] ABSTRACT

A data reading and image processing system for a video entertainment system with a CD-ROM capability is disclosed with a pair of separate computer systems that are controlled through a controller for accessing data from a memory unit. A first computer system can control the reading of data and the storing of the data in the memory unit in coordination with a first synchronization time period while the second computer system can control the processing of video data signals in an image processing circuit during a second synchronization time period. The data can be appropriately enabled to a position within the memory unit to assist in parallel processing by both computer systems.

8 Claims, 13 Drawing Sheets

| 1 | 3 | 5 | 6 | 12 | 8 | | | | |
|---|---|---|---|---|---|---|---|---|---|
| | | | | | | | | | |

FIG. 12A

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |

FIG. 12B

| 11 | 12 | 13 | 14 | 15 | 16 | 17 | 18 | 19 | 20 |
|---|---|---|---|---|---|---|---|---|---|
| 21 | 22 | 23 | 24 | 25 | 26 | 27 | 28 | 29 | 30 |

FIG. 13

DATA READING AND IMAGE PROCESSING SYSTEM FOR CD-ROM

BACKGROUND OF THE INVENTION

1. Field of the Invention

The present invention provides a data reading and image processing system using a compact disc storage device and, more particularly, provides two separate CPU (central processing units) systems to enable parallel processing and control of a music and video entertainment system that provides game play with operator interface.

2. Description of Related Art

Video game systems have been extremely popular in providing interactive game play with an operator. Generally, these video game systems have used a microprocessor-based controller that can be connected to a television set and can receive ROM cartridges for providing game play on the video screen with operator controls enabling an interaction with the play of the game. While these game systems have proven to be extremely popular, there has been an increasing demand for more complex game play and more detailed video images. As a result, video game systems have sought to use the increased storage capacity of optical compact disc ROMs (CDs), and have also sought to expand the entertainment possibilities, such as the reproduction of music by a CD player that can be used for not only storing video images, but also the conventional music data associated with a CD player.

In the conventional image processing systems using a CD, one CPU system is used for controlling both the reading of image data and the processing of the image data for image display. As a result, when image data processing or image display is being carried out, other processing and control operations cannot be carried out. As a consequence, the processing speed is substantially decreased, and the capacities of the expanded memory of the CD-ROM is limited. While the compact disc was originally a medium partially established for recording sound, its capability of recording a much larger amount of information than conventional recording media in the form of a digital recording lends itself to recording information other than audio information, such as video information, etc. When used in a television game system, the video information that is stored on the CD-ROM is accessed throughout the progress of the game. Thus, video information that is stored on a CD-ROM must be read out and used as video images of the game, depending upon the various game play options that can be established by the operator's skill and choices.

While the CD-ROM permits a TV game machine to provide a much better quality of display of video images, there has been a limitation in its adaptability to the conventional data reading and imaging processing systems that have been used in this field. As can be appreciated, TV game entertainment systems are relatively competitive, and price limitations impose serious constraints on the hardware components that can be utilized.

Another problem that has occurred exists when the CD operation requires a video display on the TV picture or CRT, such as when various operator instructions must be input into the system. In a play action mode, it is difficult to switch to an operator menu while the CD graphic image is being displayed. Usually in the conventional operation, in order to switch, the CD operation that is currently in play must be stopped, and an operational picture or menu is displayed. Only after the operation with that menu is completed can the game play or CD graphic image be again displayed. Further, when a particular CD program is to be selected, e.g., a program selection menu in the conventional scheme, the display can be made only for a presubscribed number of programs, and there is a limitation on the number of programs that can be assigned or the degree of complicated instructions that can be implemented.

FIG. 3 shows a conventional CD data read and image processing device with data stored on a CD-ROM being read out for processing. CPU 30 controls both a CD-ROM drive unit 32 for reading the data recorded on the CD-ROM and an image processing unit 34 for displaying the data recorded on the CD-ROM as video images. The video image processed by image processing unit 34 is displayed on a TV screen 36. In order to retain the recording data of the CD-ROM for operational processing, CPU 30 has a random access memory 38.

CD-ROM drive unit 32 can read the data from CD-ROM at a rate of 2048 bytes per 1/75-second. However, in order to display a video image using image processing unit 34, it is necessary to process the read data at a different synchronization speed of 1/60-second in the case of an NTSC video format. As the synchronization timing of CD-ROM drive unit 32 and image processing unit 34 are different from each other, there are resulting problems related to the operation of the CD data read and image processing system.

The operation of the conventional CD data read processing device may be further explained with reference to FIGS. 4-6. In FIGS. 4 and 5, the operation is carried out with a priority set for a CD interruption from CD-ROM drive unit 32 over the video interruption from the image processing unit 34. The image data of 2048×5 bytes (1 scene) inputted in five cycles from the CD-ROM in 1/75-second for each cycle are outputted as a video image in four cycles by the image processing unit 34.

As shown in FIG. 4, because the CD interruption from CD-ROM drive unit 32 is set with priority, data from CD-ROM is stored in buffer area A of memory 38 at a rate of 2048 bytes per 1/75-second. On the other hand, image processing unit 34 generates a video interruption for processing the data stored in buffer area B of memory 38 at a rate of 2560 bytes per 1/60-second to form a video image. If the read control of CD-ROM drive unit 32 has not ended, data processing is carried out by image processing unit 34, only after the CPU 30 is released from the read control mode.

In addition, as the busy time of CPU 30 is long due to image processing unit 34, when CD interruption is generated before the end of data processing by image processing unit 34, such as after 4/75-second, CD interruption is set as priority, and CD-ROM read control by CD-ROM drive unit 32 is carried out by CPU 30. As shown in FIG. 4, data processing by image processing unit 34 is interrupted.

When the busy time of CPU 30 for image processing unit 34 becomes even longer, as shown in FIG. 5, interruption of data processing by image processing unit 34 takes place even more frequently (after 3/75-second, 4/75-second).

Consequently, it is considered to let the video interruption from image processing unit 34 take priority over the CD interruption from CD-ROM processing unit 32. When the busy time of CPU 30 for image processing unit 34 is short, during the period when CPU 30 is not busy for image processing unit 34, CD-ROM read control by CD-ROM drive unit 32 can be carried out. However, as shown in FIG. 6, when the busy time of CPU 30 for image processing unit 34 becomes longer, the CD-ROM read control by CD-ROM drive unit 32 interrupts after, say, 1/60-second by video interruption.

Thus, the prior art is still seeking to solve the problems of the discrepancy in synchronization timing of the CD-ROM drive unit and the image processing in an economical manner and further to facilitate a switching of the operational picture being played on the video screen so they can be switched with a CD graphic picture and a selection of programs with the CD can be carried out by the operator in an efficient manner.

SUMMARY OF THE INVENTION

The present invention provides a video computer game system or entertainment system which enables an operator to play a game stored as data on a compact disc ROM that can be read at a first synchronization time period that is different from a second synchronization time period necessary for processing the data to provide video drive signals. The compact disc data processing system can include a memory unit that can receive data read from a CD disc through a CD-ROM drive unit. A first computer system can control the reading of data by the CD-ROM drive unit and can store the read data in the memory unit in coordination with the first synchronization time period. An image processing circuit can process the read data to provide video drive signals in coordination with a second synchronization time period. A second computer system can control the processing of the video drive signals during the second synchronization time period. A control unit such as a gate array or computer-controlled switch system can coordinate the storage of the read data into the memory unit and the reading of the data out of the memory unit to enable a coordination of the processing of data by the first and second computer systems. The two computer systems can function independently in a parallel processing of data to enhance both the processing speed and capabilities of the entertainment game system.

In operation, a CD graphics picture can further include a switch instruction region that is set for switching to an operational picture. Conversely, the operational picture can also include a switch instruction region for switching to the CD graphic. Thus, a cursor or other operator-controlled designating device can interact with the switch regions so that switching can be performed even during a play mode of operation. Consequently, by using the function of setting the operational picture, an image of the CD graphics can be utilized. Additionally, as a number of programs in the CD can be displayed on a picture, the programs can be selected easily, for example, with the aid of a scrolling function, and cancellation of a selected program also can be easily done. Thus, setting the operational functions desired by the operator on the video screen can be easily accomplished.

In summary, the image data reading and image processing system using two independent CPU's, which can perform independent operations simultaneously, enable data processing to be carried out at a high speed and with high efficiency while further enhancing the ease with which the operator can interface with switched instruction regions on various video displays on the CRT. The first CPU system can be used for image processing the data from the CD with a memory for storing image data processed by the first CPU system via a switching device. A second CPU system can read and process image data from the memory via the switching device. A video data display processor circuit can input the process data from the second CPU and display them on a display screen. Switching can be carried out between the CD picture being played and the operational picture and the program selection on the CD can be performed with a scrolling function.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 12A and 12B are diagrams illustrating the selection of music on a CD;

FIG. 13 is a diagram illustrating the scrolling of program selection;

DESCRIPTION OF THE PREFERRED EMBODIMENTS

The following description is provided to enable any person skilled in the art to make and use the invention and sets forth the best modes contemplated by the inventors of carrying out their invention.

Various modifications, however, will remain readily apparent to those skilled in the art, since the generic principles of the present invention have been defined herein specifically to provide an improved data reading and image processing system for an entertainment system.

Figure 1:
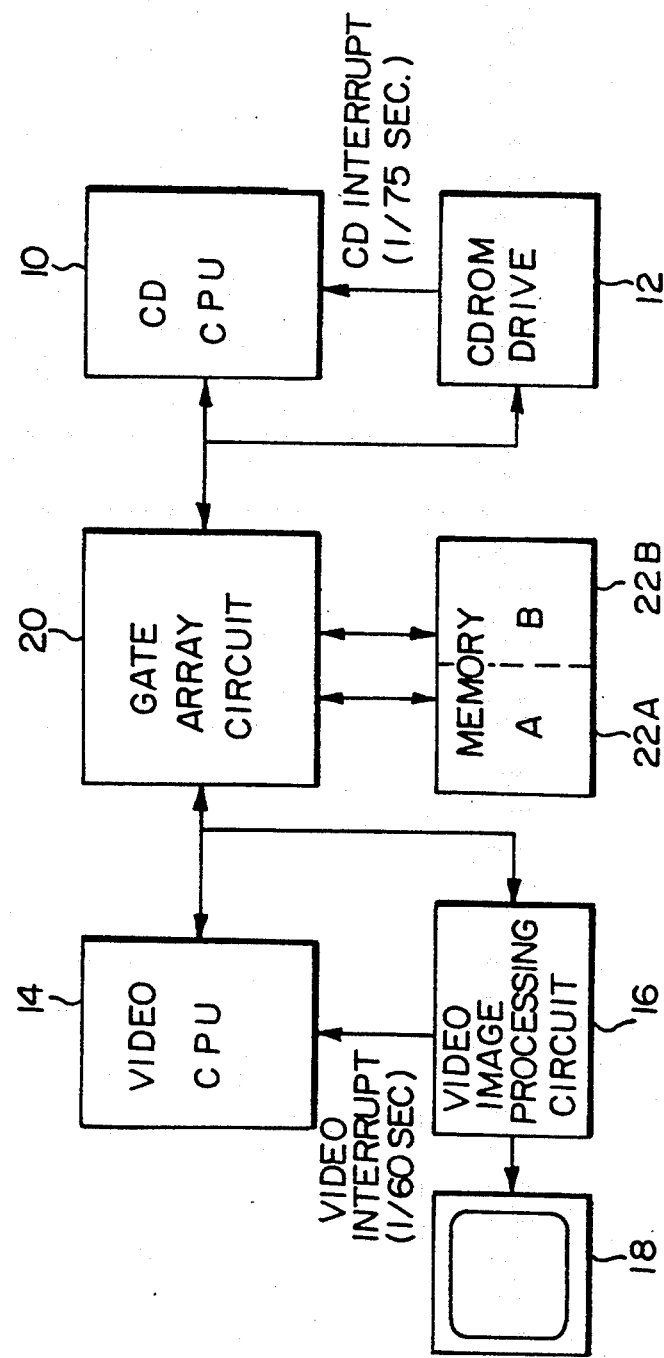
FIG. 1 is a block diagram of the CD data read and image processing system of this invention.

This invention will be explained in more detail with reference to an example illustrated by FIGS. 1 and 2.

CPU 10 for controlling the reading of data from a CD is set for controlling CD-ROM drive unit 12 to read the data recorded on a CD-ROM (not shown). CPU 14 for controlling the video signals is set for controlling an image processing unit 16 for displaying the recording data of the CD-ROM as a video image. The video image processed by image processing unit 16 is displayed on a TV screen 18.

A gate array 20 interconnects with CD CPU 10 and video CPU 14 between memories 22A and 22B, and it can control the operation of CD CPU 10 and video CPU 14. That is, under control of CD CPU 10, CD recording data read from CD-ROM drive unit 12 at a timing of 1/75-second are stored in memory 22A or memory 22B. At the same time, the CD recording data read from memory 22B or memory 22A are processed by image processing unit 16 for each 1/60-second under control of video CPU 14. At a timing not occupied by both CD CPU 10 and video CPU 14, gate array 20 can control a data exchange between memory 22A and memory 22B.

The operation of the CD data read and image processing system in this example can be explained with reference to FIG. 2.

Figure 2:
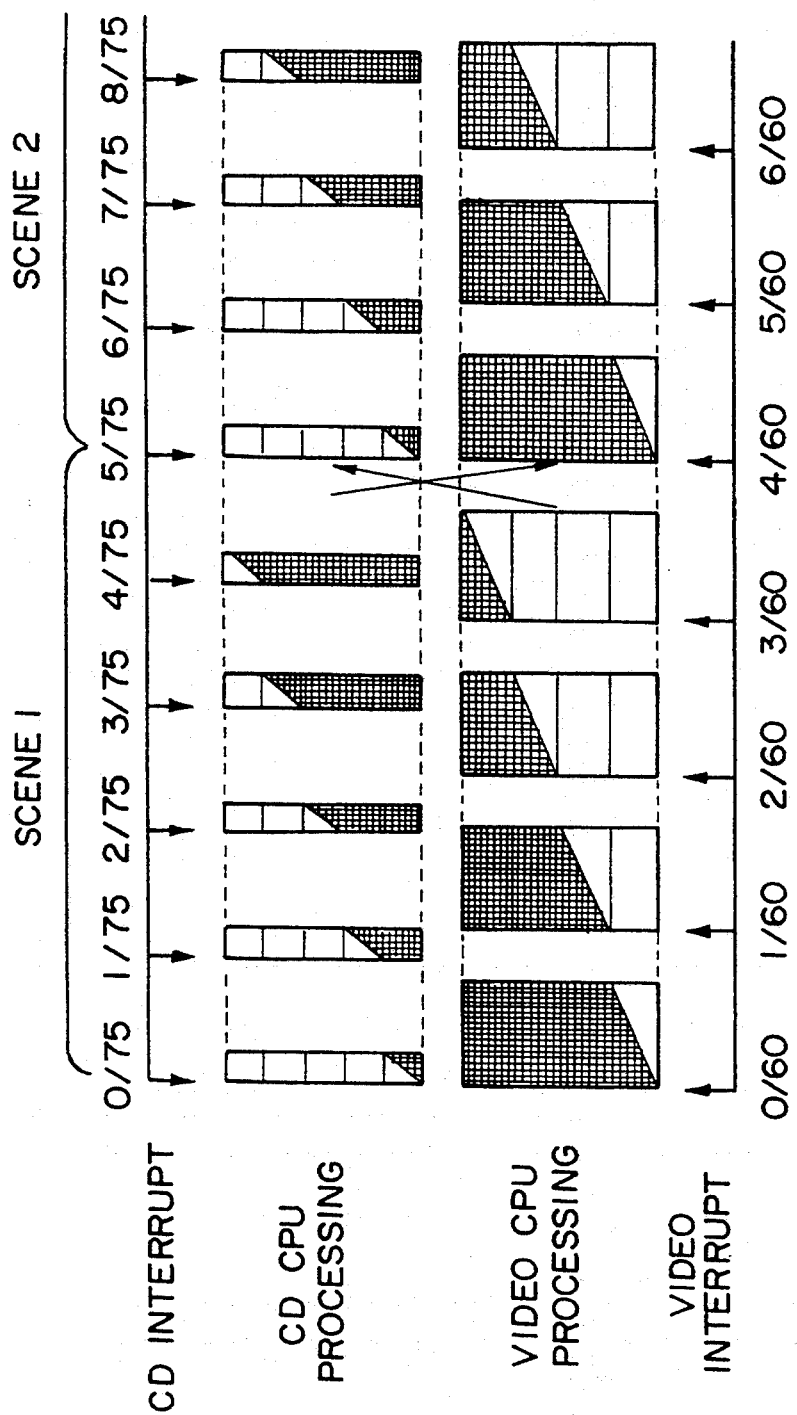
FIG. 2 is a diagram illustrating an operation of the CD data read and image processing of this invention.
Figure 3:
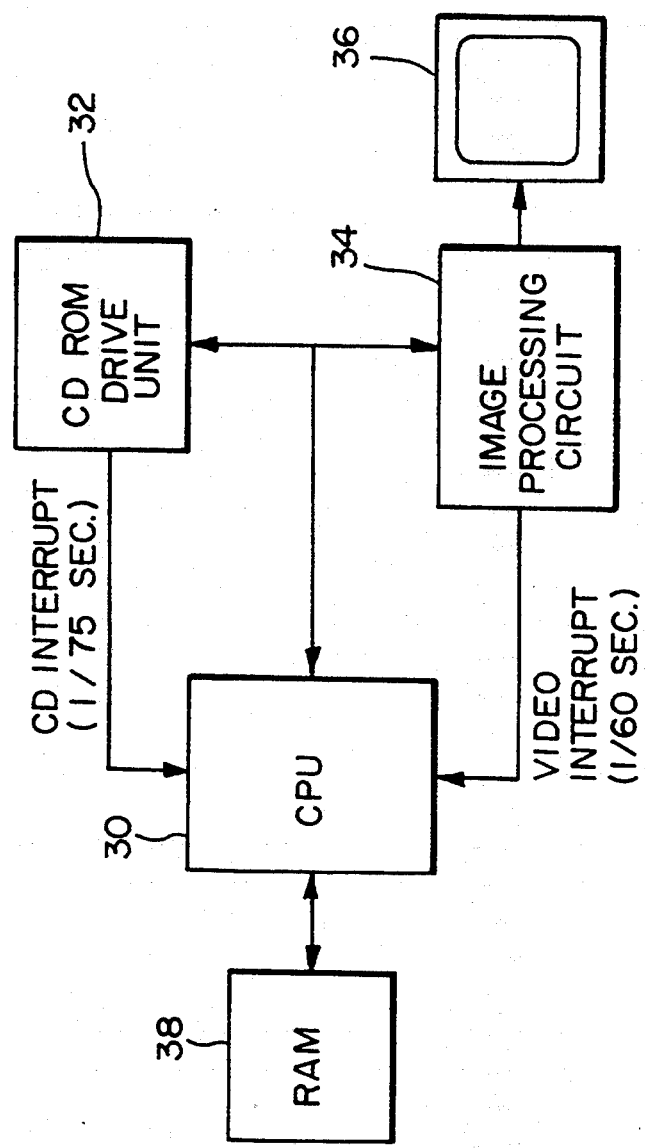
FIG. 3 is a block diagram of a conventional CD data read and image processing system.
Figure 4:
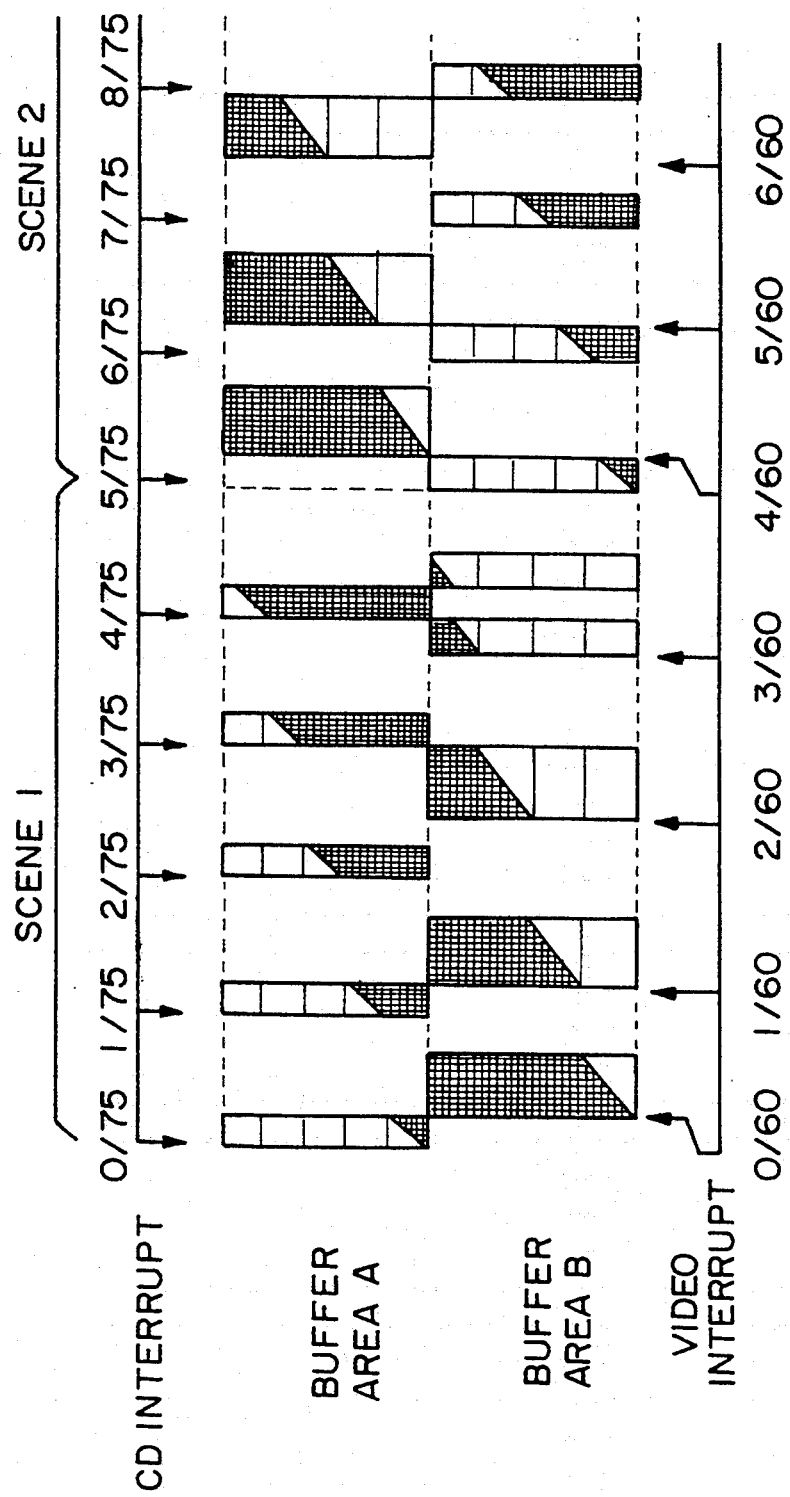
FIG. 4 is a diagram illustrating an operation of the conventional CD data read and image processing.
Figure 5:
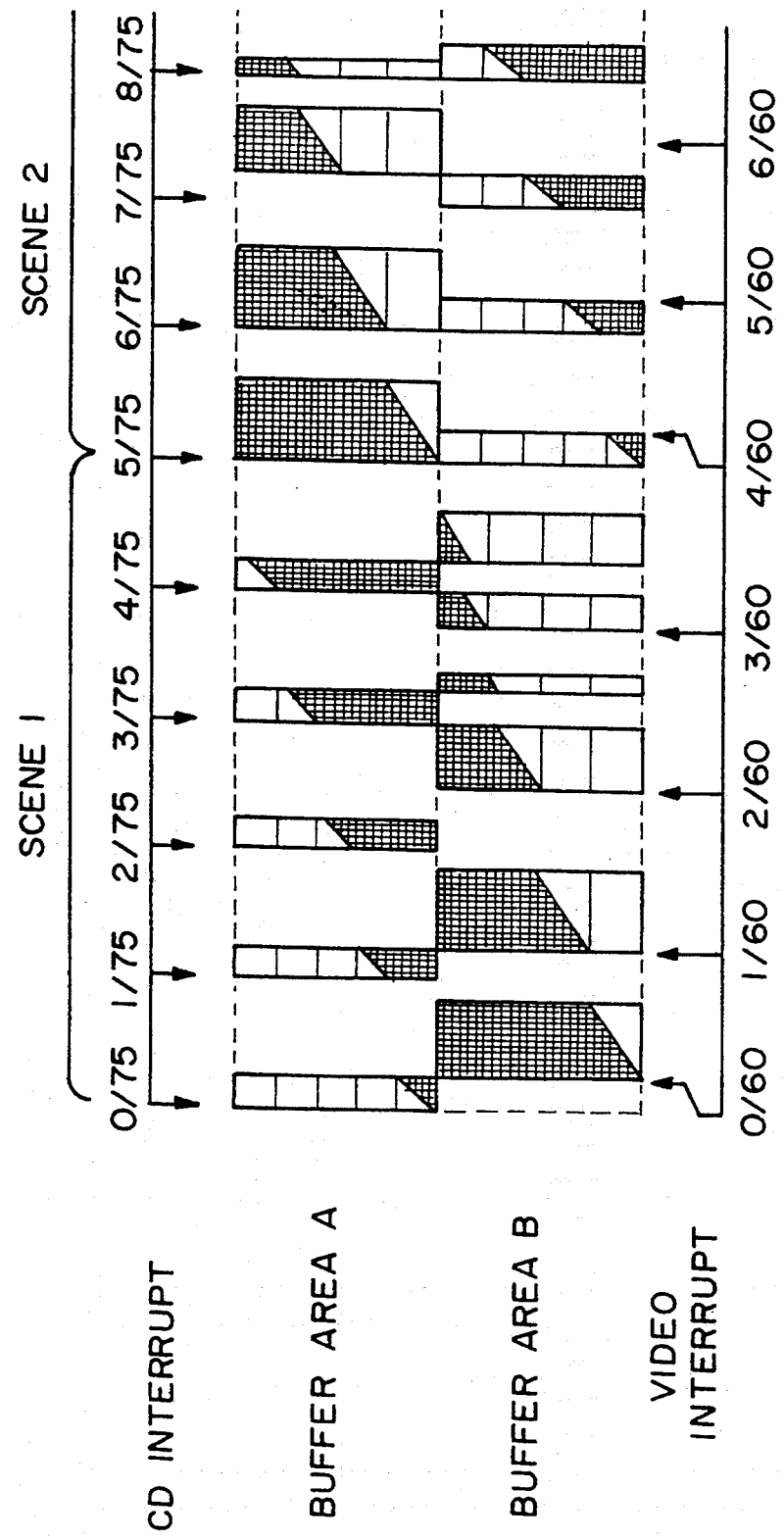
FIG. 5 is a diagram illustrating the operation of the conventional CD data read and image processing.
Figure 6:
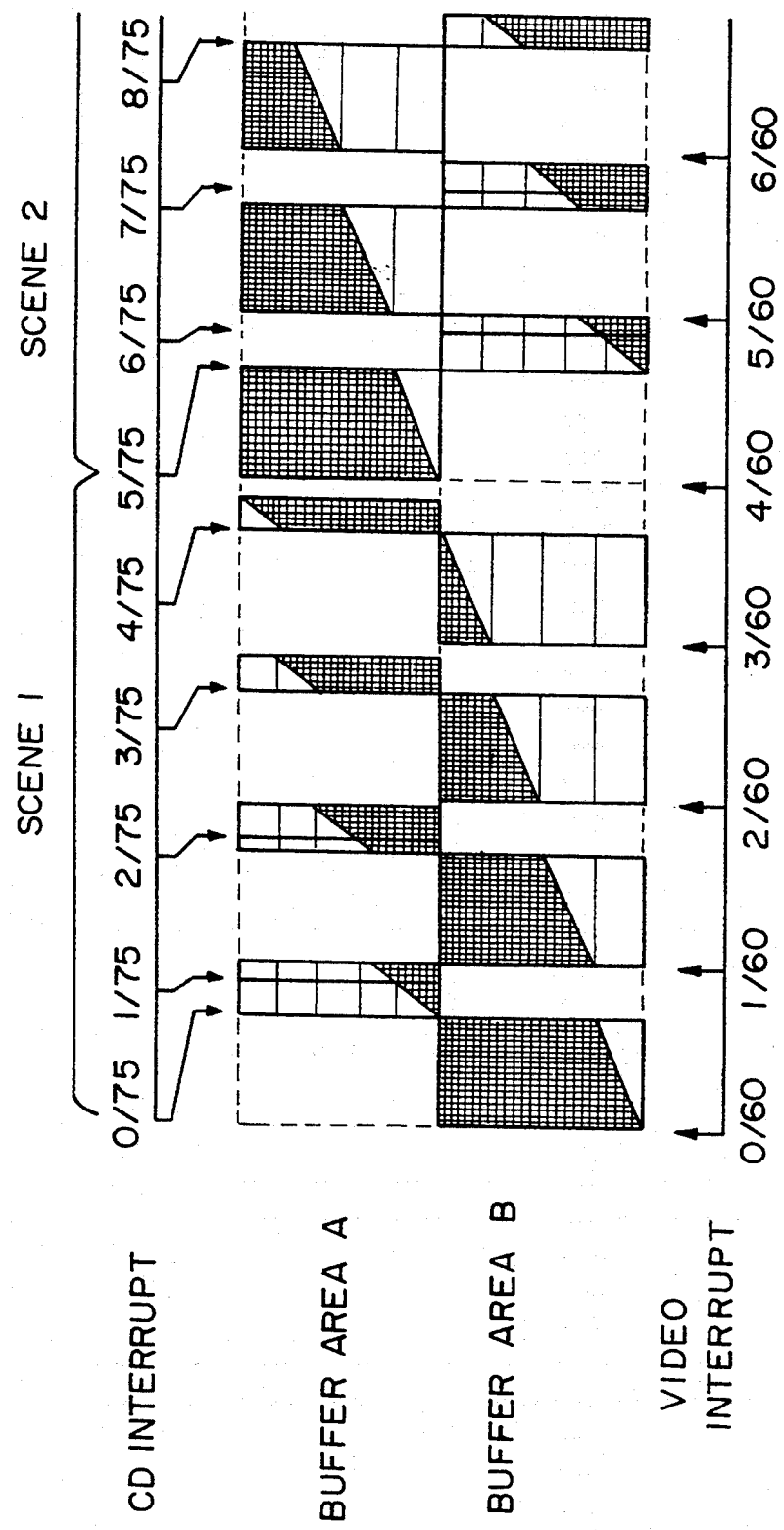
FIG. 6 is a diagram illustrating the operation of the conventional CD data read and image processing.

As shown in FIG. 2, with respect to a CD interruption from CD-ROM drive unit 12, CD CPU 10 immediately performs the processing of reading data, and the CD recording data are stored by way of gate array 20 into, say, memory 22A. On the other hand, with respect to a video interruption from image processing unit 16, video CPU 14 immediately performs an image processing, and the CD recording data stored in memory 22B are taken out via gate array 20 and are displayed as a video image on TV screen 18. When the processing of the data of one scene by CD CPU 10 and video CPU 14 is completed, data exchange is carried out between memory 22A and memory 22B and the data processing for the next scene is accordingly prepared.

In this way, for the CD data read and image processing system in this application example, CD CPU 10 for controlling CD-ROM drive unit 12 and video CPU 14 for controlling image processing unit 16 are operated separately from each other. Consequently, there is no interruption in the processing of data due to a busy CPU as in the conventional scheme, and the data of CD-ROM can be both read and image processed smoothly.

This invention is not limited to the afore-mentioned application, and various variations may be applied. For example, in the afore-mentioned application example, read processing is performed for data recorded on CD-ROM. However, this invention can also be applied in the read processing of data recorded on other CD's, such as CD, CD-ROM-XA, CD-I, CD-G, CD-V, etc.

In the afore-mentioned application example, the CD recording data recorded on a CD-ROM are processed and the TV image is displayed. However, this invention may also be applied in the processing of other types of data recorded on the CD-ROM in addition to image data.

As explained above, according to this invention, a first CPU for controlling the CD drive unit and a second CPU for controlling the data processing unit are set separately; hence, even when the synchronization timing of the CD drive unit is different from the synchronization timing of the data processing unit, the CD data can still be read and processed smoothly without interruption.

Figure 7:
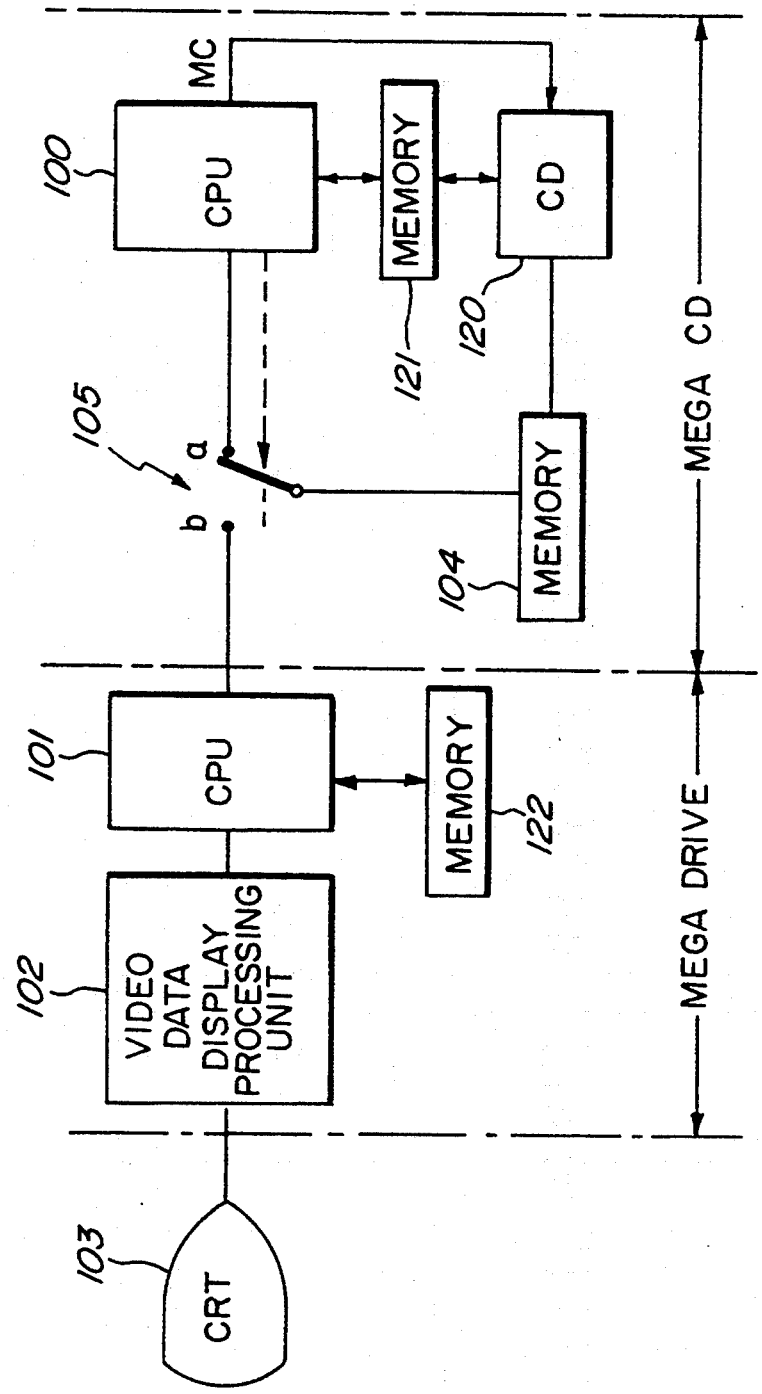
FIG. 7 is a block diagram illustrating a configuration of an alternative example of this invention.

An alternative embodiment of the present invention is defined to effectuate a switching image instruction to be realized on both a CD graphic image and an operational picture to facilitate operator selection and control of the entertainment system. FIG. 7 shows an example of a configuration of this invention. There are again two separate CPU's 100 and 101. Memory 121 is connected to CPU 100, while memory 122 is connected to CPU 101. Via a switch having contact points a and b (such as an analog switch 105), memory (RAM) 104 can be connected to CPU 100 and CPU 101. Memory 104 is divided into a first area containing the image data and a second area containing the data for transfer. Switch 105 can be controlled by CPU 100. The data from memory 104 processed by CPU 101, are sent to video data display unit 102, and the processed image is displayed on CRT 103. The information of CD-ROM 120 is inputted to memories 104 and 121, and CD 120 is operated by CPU 100 with the aid of a command MC from a CD-BIOS, to be explained later.

Figure 8:
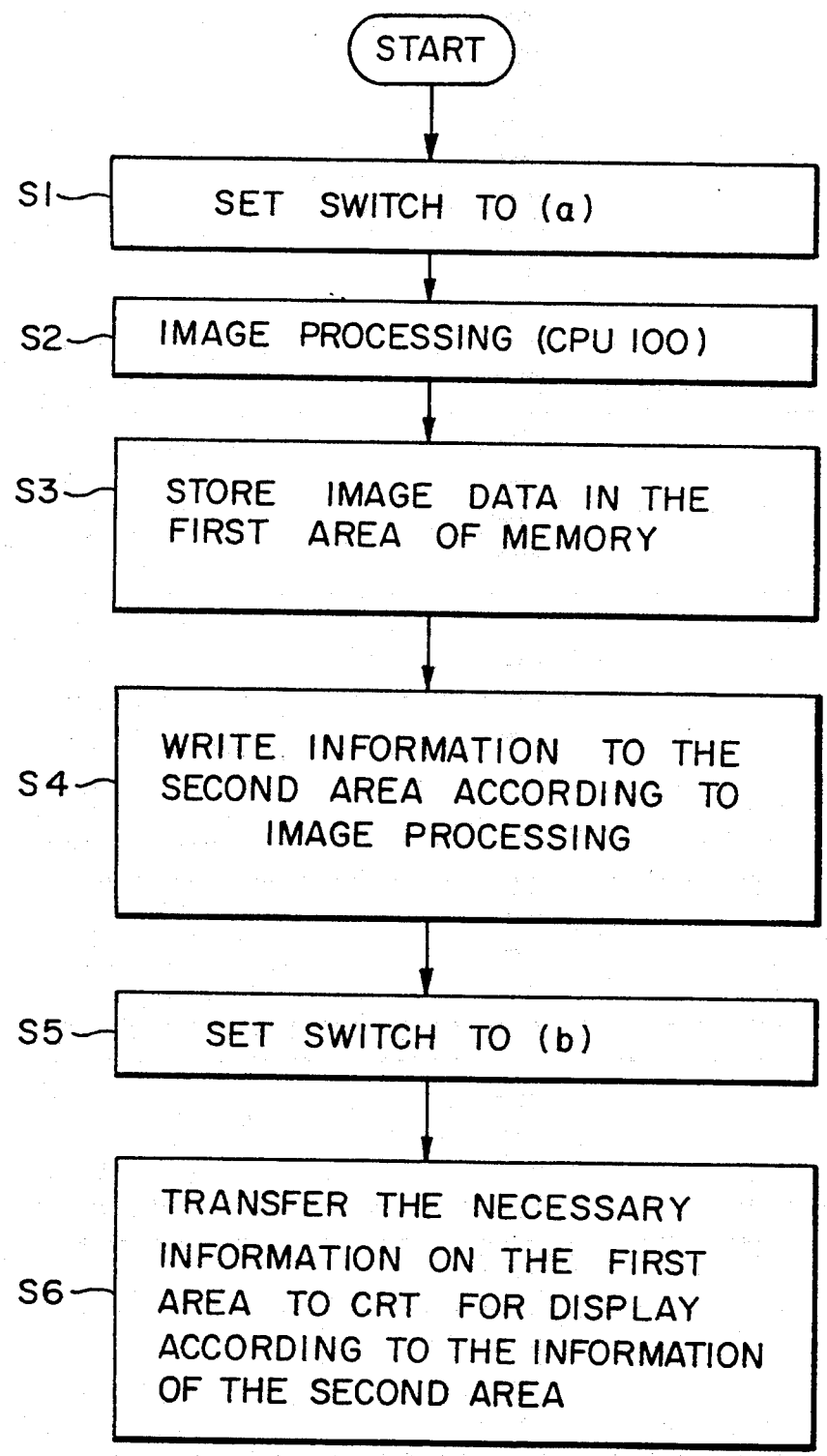
FIG. 8 is a flowchart illustrating the operation of the configuration shown in FIG. 7.

For this configuration, operation is illustrated in FIG. 8. First of all, CPU 100 turns switch 105 to contact point a (step S1); then, CPU 100 transfers command MC with respect to CD 120, and image processing is carried out together with memories 104 and 121 (step S2). The image data needed for the image processing are stored into the first area of memory 104 (step S3). Then, according to the image processing, the data for transfer are written into the second area (step S4), followed by turning switch 105 to contact point b by CPU 100 (step S5). Then, together with memory 122, CPU 101 processes the necessary information on the first area according to the information of the second area, and the processed information is transferred to CRT 103 via video display processing unit 102 (step S6).

In this configuration, there are two CPU's 100 and 101, and the connection to memory 104 is changed via switch 105. In this way, independent operations can be carried out. Consequently, for example when CPU 100 performs image processing with respect to CD 120, CPU 101 can perform other processing (such as key-in by the operator), and the overall processing speed can thus be increased.

Figure 9:
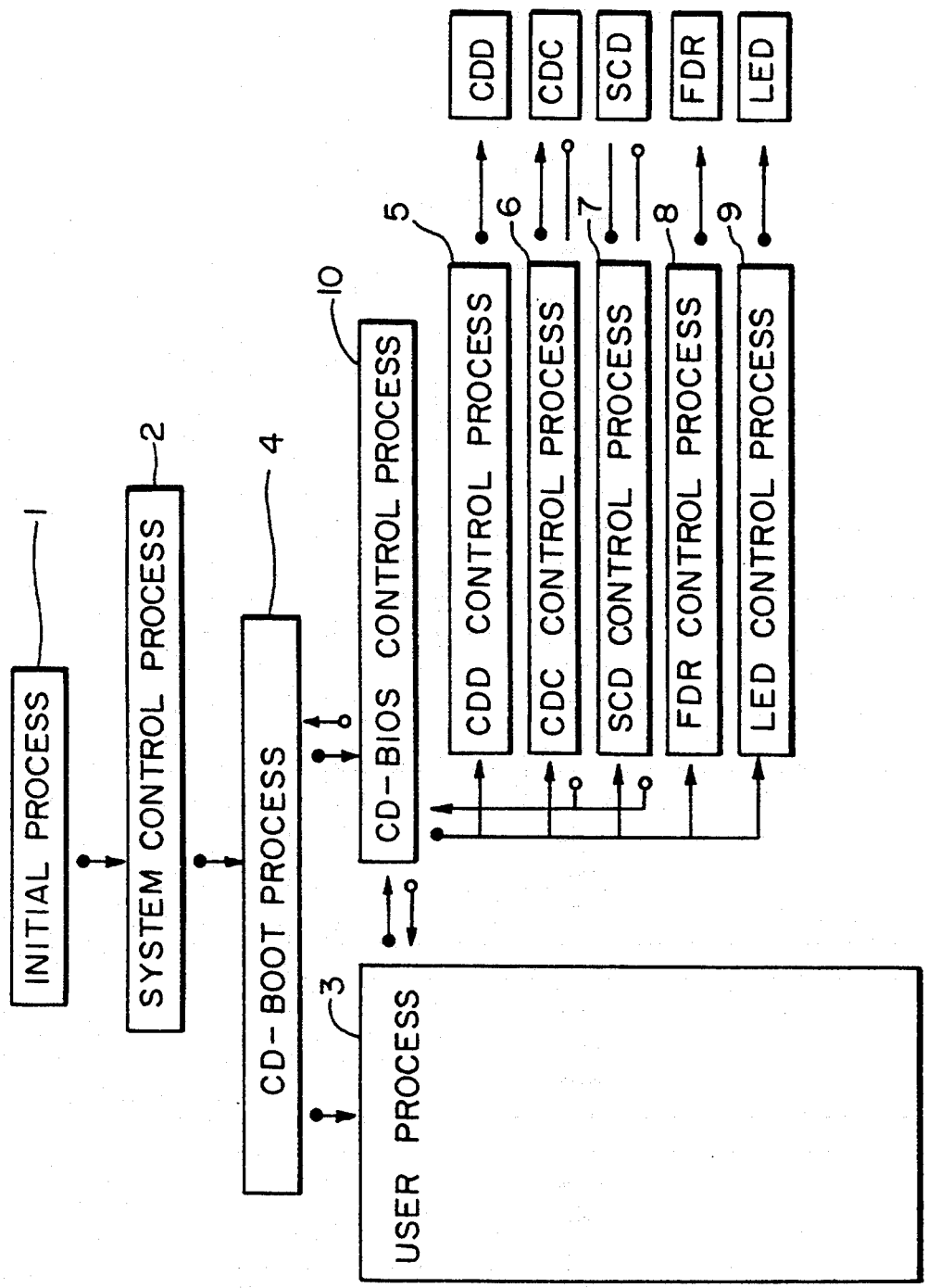
FIG. 9 is a concept diagram illustrating the CD system control unit.

FIG. 9 is a concept diagram of the CD system control unit. Each rectangular frame indicates a process fixed on the ROM in the CD, and it operates for feeding to the RAM. A dot represents a control relation, and a circle represents the flow of the data. The CD system control process is a process with operation on the SUB-CPU, which consists of the various control processes for operating the hardware directly and the interface process which is used to control them by forming a bridge with the user process. The general state of the hardware is as follows: "CDD" stands for compact disc driver, which is a mechanism for reproduction of music data. It carries a dedicated 4-bit CPU for MEGA control. "CDC" stands for CD data controller, which is a chip that can output the data from the CD after making any error correction of the CD-ROM standard. It has a 16-kilobyte buffering memory, and can buffer 5-frame decode data. "SCD" stands for a sub code 9a function contained in MEGA-CD gate array (MCG), and there is a 128-byte buffering memory contained in MCG. "FDR" stands for fader, which has the function of controlling the volume of music data (CD-DA) directly outputted from the CD drive. "LED" stands for lightemitting diode, which has the function of displaying the state of the CD drive. There are a green LED and a red LED.

The general feature of the process is as follows. In "INITIAL PROCESS" 1, the CPU is reset, and the equipment is initialized to a start state, with necessary initialization for the hardware and for the various control processes. In an interruption prohibitive state, a time of 100 msec or longer is needed. In "SYSTEM CONTROL PROCESS" 2, implementation of the system process and user process 3 is controlled, and management is performed on the interruption vector and BIOS call entry. In "CD-BOOT PROCESS" 4, the program is loaded from CD-DISC, and the control process is carried out for the various hardware depending on the requirement of the application. In "CDD CONTROL PROCESS" 5, the mechanism of the CD drive is controlled. In "CDC CONTROL PROCESS" 6, the data outputted from the CD drive have their errors corrected at "CDC." In "SCD CONTROL PROCESS" 7, the sub code data outputted from the CD drive and stored in MCG are read and error checking and error amendment are carried out. In "FDR CONTROL PROCESS" 8, the volume of the music data directly outputted from the CD drive is controlled. In "LED CONTROL PROCESS" 9, ON/OFF of the LED is controlled to represent the state of the CD drive. In "USER PROCESS" 3, BIOS is called depending on the application.

The content of the BIOS call is as follows. That is, when music is to be reproduced or data are to be read using the CD drive, a command is sent to program (BIOS) which is in charge of managing and controlling the peripheral hardware. In addition, there are also programs for management of the backup RAM and for booting from CD-DISC. After end of the initial process, the interruption of level 2 (software V-INT) and level 4 (CDD) is in the allowed state. Later, interruptions of level 5 (CDC) and level 6 (SCD) become the allowed or prohibited state by the BIOS call related to CD-ROM. When these interruptions are prohibited, BIOS cannot perform the normal operation; hence, in the case of control of the interrupt mask control port, the allowed state of the afore-mentioned levels absolutely cannot be changed. (When the allowed state of the other levels is changed, the BIT operation command is used.) As it is an indivisible processing, although there is no problem when the interrupt prohibiting state is a short time (on the order of $\mu$sec) due to the variation in the "SR" register, when the time is longer (on the order of msec), problems may take place in reading of the data. On the other hand, the level should not be set lower than the present interruption level. For CD-BIOS, as processing is carried out in the interrupt processing of level 4 or higher, BIOS call cannot be called in the interrupt processing for level 4 or higher. (For the interruption of level 4 or higher, as it is dedicated to the CD system, the user cannot use it.) Although implementation is fast for commands related to BIOS, LED, FADER, SCD, and CDC, for commands related to DRIVER, CD-DA, and CD-ROM, as the commands are received only upon request, a longer time is needed for implementation.

Figure 14:
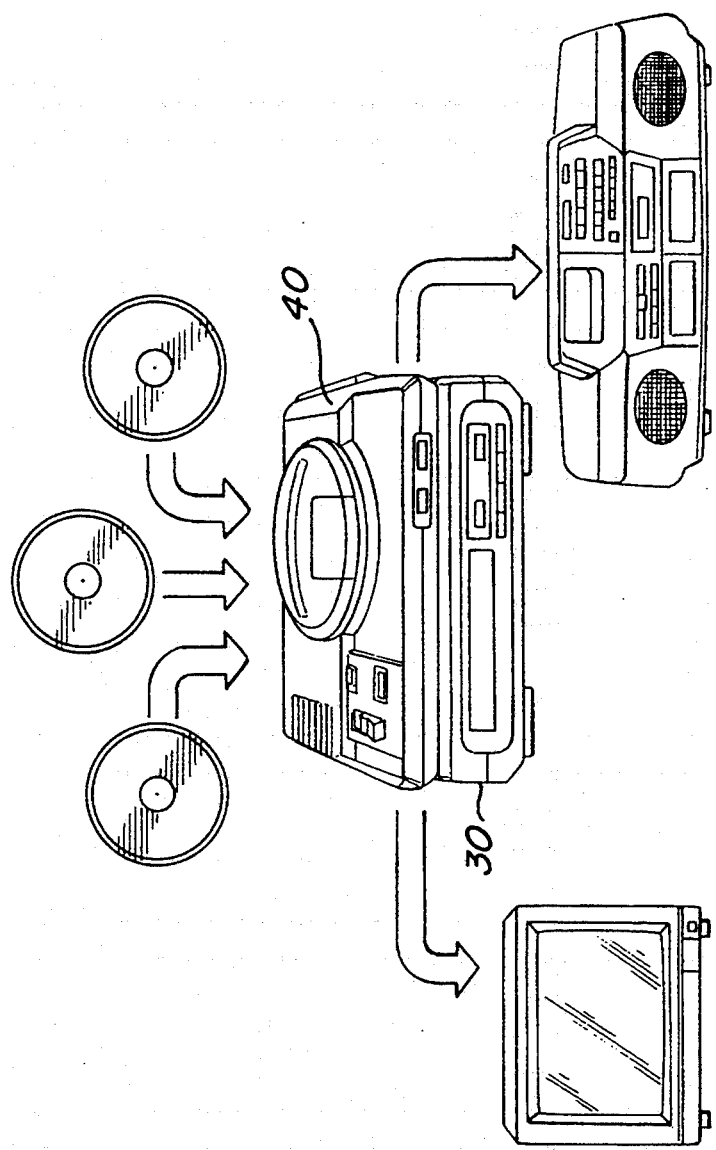
FIG. 14 shows the configuration of a MEGA-CD.

FIG. 14 shows the configuration of MEGA-CD30. In this case, connection is made to TV and audio equipment, and one can optimally enjoy a software game (CD-ROM), music (CD), and karaoke (CD graphics). All of the operation is carried out by control pad 20 shown in FIG. 15, and it is implemented by selecting the command on the control picture. If radio cassette equipment is connected, a high-quality stereo sound can be further played. On control pad 20, there is a direction button 21 which can be used to move a cursor on the screen in the direction for selecting the command, a start button 25 which commands the control picture, a button 22 which determines the command selected by direction button 21, and buttons 23 and 24 which indicate an ON/OFF state of the control panel. On the control panel, the music number, play time, channel, play command, program selection command, etc., are displayed.

Figure 15:
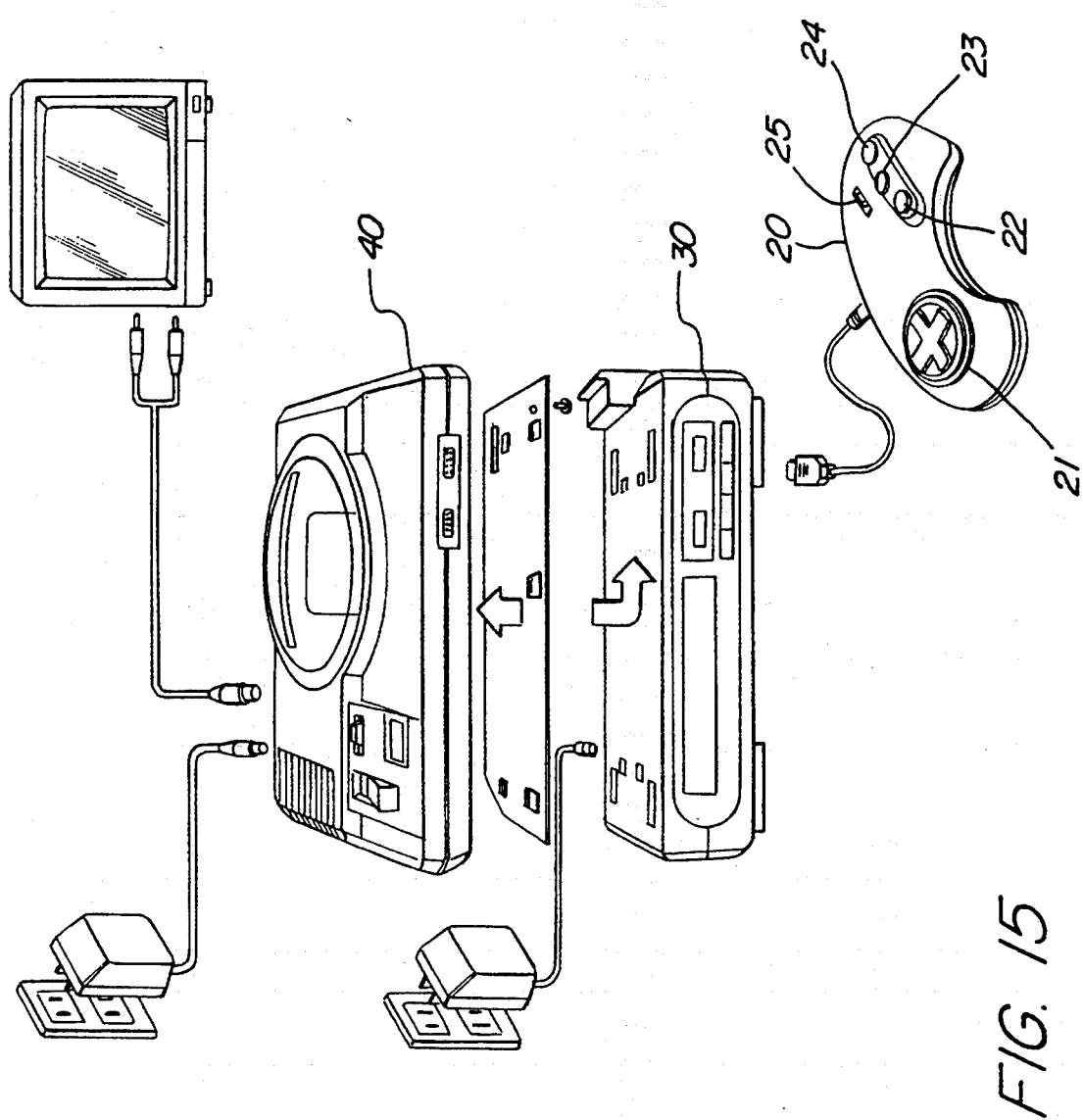
FIG. 15 shows the connection relationship between the MEGA-CD and a MEGA-drive.

FIG. 15 shows the connection relationship between MEGA drive 40 and MEGA-CD 30 and other equipment. MEGA drive 40 is fixed on MEGA-CD 30 via a joint steel sheet and screws, and is connected to an AC adaptor. Control pad 20 is connected to MEGA-CD 30, and a TV set is connected to MEGA drive 40 via a DIN-plug cord.

Figures 10A, 10B:
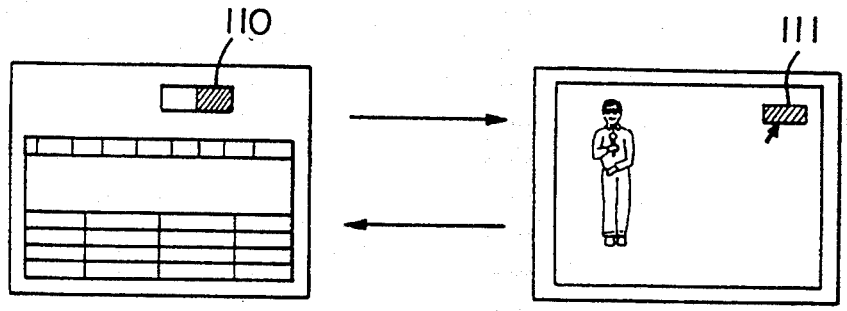
FIGS. 10A and 10B are diagrams illustrating an example of an operation picture and a play picture.

According to this invention, for CD graphics, program music selection and other functions can be used effectively as a switch can be made between the operation picture on the screen and the picture of the CD graphics. FIG. 10A illustrates the operation picture, which contains a switching area 110 for indicating a switch to the play picture. FIG. 10B shows the play picture, which also contains a switching area 111 for indicating a switch to the operation picture. The operator can move a cursor for activating the switching area.

Figure 11:
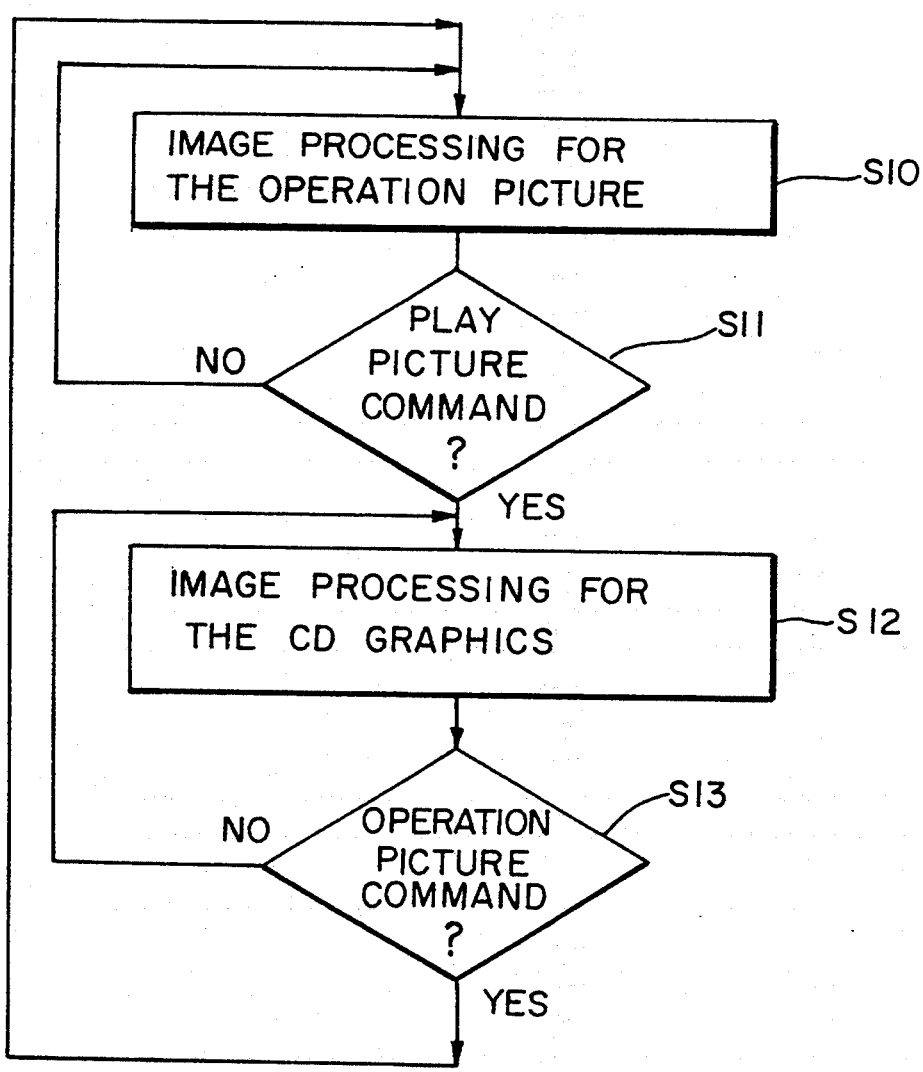
FIG. 11 is a flowchart illustrating a switching operation of the operation picture and the play picture.

FIG. 11 is a flowchart illustrating the switch operation between the operation picture and the CD graphics. During the operation picture processing shown in FIG. 10A (step S10), when the cursor denotes switching area 110 and indicates a switch to the play picture (step S11), the play picture processing of the CD graphics as shown in FIG. 10B is reached (step S12). Then, as the cursor denotes switching area 111 on the play picture, and the switch to the operation picture is indicated (step S13), the operation processing state shown in FIG. 10A is reached. In this way, a switch action can be performed between CD graphics and the operation picture during the play process; hence, the functions set on the operation picture can be used for the CD graphics. In addition, the picture processing of the CD is continued in the operation picture processing, and when the play picture is recovered, the play picture at the moment is displayed.

FIGS. 12A and 12b illustrate the program selection of the CD. FIG. 12B shows the individual music pieces contained on the CD. As the number is denoted by the cursor as shown in FIG. 12B, the selected number is represented as a sequential program as shown in FIG. 12A. When there are 21 or more music pieces on the CD, a scroll display as shown in FIG. 13 is performed to facilitate selection of the music. As shown in FIG. 12A, when music is to be canceled from the program, one may simply move the cursor to the program number, and the selected program number can be canceled, and the later music pieces are shuffled forward.

According to this invention, in the image processing system, there are two CPU's which can operate independently; hence, high-speed processing can be carried out. In this way, even during the play process, a switch between the operation control picture and the picture of the CD graphics can still be carried out. In addition, due to the scroll function, selection of the music pieces of the CD can be performed easily.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A video computer game system that enables an operator to play a game stored as data on a compact disc that is read at a first synchronization time period that is different from a second synchronization time period necessary for processing the data to provide video drive signals including a data processing system comprising:

a memory unit;
   means for reading data stored on a compact disc;
   a first computer system for controlling the reading of data by the reading means and storing the read data in the memory unit in coordination with the first synchronization time period;
   image processing means for processing the read data to provide video drive signals in coordination with the second synchronization time period;
   a second computer system for controlling the processing of video drive signals during the second synchronization time period, the second computer system operating also when the first computer system is operating to provide parallel processing of data; and
   control means for coordinating the storage of read data into the memory unit and reading of data out of the memory unit to enable a coordination of the processing of data by the first and second computer systems so that the same data is not being accessed in the memory unit by either the first and second computer systems at the same time period.

2. The invention of claim 1, wherein the control means includes a gate array circuit.

3. The invention of claim 1, wherein the control means includes a switch member controlled by one of the first and second computer systems.

4. The invention of claim 1, wherein the control means accesses data stored in the memory unit in a third synchronization time period to enable the second computer system to process video drive signals.

5. The invention of claim 1, further including a video display member and means for providing a switching image on the video display member.

6. The invention of claim 5, further including means to scroll the identification of data available on the compact disk to the operator.

7. The invention of claim 6, further including an operator control panel to provide a cursor for interface with the switching image.

8. A combination of a video computer game system with a compact disk data processing system for a television game system, comprising:

means for reading data stored on a compact disk;
   a first memory unit;
   a second memory unit;
   a first computer system for controlling the reading of data by the reading means and storing the read data in one of the first memory unit and the second memory unit in coordination with a first synchronization time period;
   image processing means for processing the data read from one of the first memory unit and the second memory unit to provide video drive signals;
   a second computer system for controlling the processing of video drive signals by the image processing means in coordination with a second synchronization time period; and
   controller means for enabling the parallel processing of reading data to the first memory unit while processing read data from the second memory unit so that the same data is not being accessed by either the first and second computer systems at the same time period.

* * * * *